US011087331B2

(12) United States Patent
Zhang et al.

(10) Patent No.: US 11,087,331 B2
(45) Date of Patent: Aug. 10, 2021

(54) FAILURE DETECTION AND LOGGING FOR A TOLL-FREE DATA SERVICE (71) Applicant: Verizon Patent and Licensing Inc., Arlington, VA (US)

(72) Inventors: Gong Zhang, Waltham, MA (US); Jian Huang, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 654 days.

(21) Appl. No.: 14/884,148

(22) Filed: Oct. 15, 2015

(65) Prior Publication Data

US 2017/0111211 A1    Apr. 20, 2017

(51) Int. Cl.
    *G06F 15/16*     (2006.01)
    *G06Q 30/00*     (2012.01)
    *H04L 29/14*     (2006.01)
    *H04L 12/24*     (2006.01)
    *H04L 29/06*     (2006.01)
    *G06Q 30/02*     (2012.01)

(52) U.S. Cl.
CPC ......... *G06Q 30/01* (2013.01); *G06Q 30/0207* (2013.01); *H04L 41/14* (2013.01); *H04L 63/08* (2013.01); *H04L 69/40* (2013.01)

(58) Field of Classification Search
CPC ......... H04L 41/14; H04L 63/08; H04L 69/40; H04L 43/0882; H04L 43/16; H04L 47/125; G06Q 30/01; G06Q 30/0207
USPC ....................................................... 709/223
See application file for complete search history.

(56) References Cited

U.S. PATENT DOCUMENTS

| 6,965,241 | B1 * | 11/2005 | Liu | G01R 27/28 324/601 |
| 9,974,042 | B2 * | 5/2018 | Skaaksrud | G16H 10/65 |
| 2007/0201641 | A1 * | 8/2007 | Bar | G06Q 20/14 379/114.03 |
| 2009/0217364 | A1 * | 8/2009 | Salmela | H04W 12/0608 726/6 |
| 2010/0027560 | A1 * | 2/2010 | Yang | H04L 47/745 370/468 |

(Continued)

FOREIGN PATENT DOCUMENTS

WO      WO-2013101123 A1 *    7/2013     ............. G06F 11/08

OTHER PUBLICATIONS

HitAnomaly: Hierarchical Transformers for Anomaly Detection in System Log Shaohan Huang;Yi Liu;Carol Fung;Rong He;Yining Zhao;Hailong Yang;Zhongzhi Luan IEEE Transactions on Network and Service Management (Year: 2020).*

*Primary Examiner* — Oscar A Louie
*Assistant Examiner* — Oluwatosin M Gidado (57) ABSTRACT

A first device may receive an error log relating to an error associated with accessing content that is associated with a toll-free data campaign. The error log may include information identifying the error. The first device may determine a cause of the error based on the error log. The first device may determine an updated status of the content or the toll-free data campaign. The first device may generate an error explanation based on the cause of the error and the updated status. The error explanation may identify the cause of the error or the updated status. The first device may cause the error explanation to be provided to a second device that is associated with the error log.

20 Claims, 8 Drawing Sheets

(56) References Cited

U.S. PATENT DOCUMENTS

| | | | |
|---|---|---|---|
| 2010/0305991 A1* | 12/2010 | Diao | G06Q 10/04 |
| | | | 705/7.21 |
| 2011/0171952 A1* | 7/2011 | Niu | H04L 43/16 |
| | | | 455/422.1 |
| 2011/0219093 A1* | 9/2011 | Ragunathan | G06F 15/16 |
| | | | 709/207 |
| 2011/0246781 A1* | 10/2011 | Morita | G06F 21/54 |
| | | | 713/180 |
| 2011/0261701 A1* | 10/2011 | Coates | H04L 43/065 |
| | | | 370/242 |
| 2014/0025995 A1* | 1/2014 | Narayanan | G06F 11/0706 |
| | | | 714/37 |
| 2014/0297589 A1* | 10/2014 | Chen | G06F 17/30 |
| | | | 707/624 |
| 2014/0365271 A1* | 12/2014 | Smiley | G06Q 10/0635 |
| | | | 705/7.28 |
| 2015/0127979 A1* | 5/2015 | Doppalapudi | G06F 11/0709 |
| | | | 714/15 |
| 2015/0312356 A1* | 10/2015 | Roth | G06F 11/25 |
| | | | 709/226 |
| 2015/0347923 A1* | 12/2015 | Bartley | G06F 11/079 |
| | | | 706/12 |
| 2016/0283522 A1* | 9/2016 | Grueneberg | G06F 11/36 |
| 2016/0340057 A1* | 11/2016 | Nguyen Manh | G06Q 10/20 |
| 2016/0371167 A1* | 12/2016 | Manolios | G06F 8/10 |
| 2017/0012955 A1* | 1/2017 | Petrack | H04L 63/08 |
| 2017/0277837 A1* | 9/2017 | Glidewell | G06Q 30/0201 |
| 2017/0308381 A1* | 10/2017 | Zbiciak | G06F 9/30014 |

\* cited by examiner

FAILURE DETECTION AND LOGGING FOR A TOLL-FREE DATA SERVICE

BACKGROUND

Service providers, such as online media companies, may wish to deliver content to network users. Some service providers may choose to subsidize the cost of network data usage which would otherwise be paid by the network users accessing the content.

DETAILED DESCRIPTION OF PREFERRED EMBODIMENTS

The following detailed description of example implementations refers to the accompanying drawings. The same reference numbers in different drawings may identify the same or similar elements.

A service provider may want to provide content to a network user. The service provider may want to subsidize the cost of network data usage which would ordinarily be charged to the network user to access the content. For a network device to recognize that the content is to be subsidized, the service provider may associate particular information with the content, and the network device may authenticate the particular information to determine that the content is to be subsidized. In some cases, the network device may validate a campaign associated with the content to ensure that the service provider is entitled to subsidize the content, and to ensure that the network user is entitled to access the subsidized content.

In some cases, the authentication and/or validation may fail (e.g., based on a technical mishap, an incorrectly configured device, an expired campaign, an unauthorized network user attempting to access content, etc.). In such cases, the network user may be billed for accessing the content. Implementations described herein permit the network device to determine a cause of the failure of authentication/validation, and to notify the network user of the failure and/or the cause. Further, the network device may determine an updated status of a campaign associated with the content, and may provide information identifying the cause and/or the updated status. In this way, the network device notifies network users of failures relating to a toll-free data service, which conserves network resources and saves time and money for network users that may otherwise attempt to access content under the assumption that the content is subsidized.

Figure 1A:
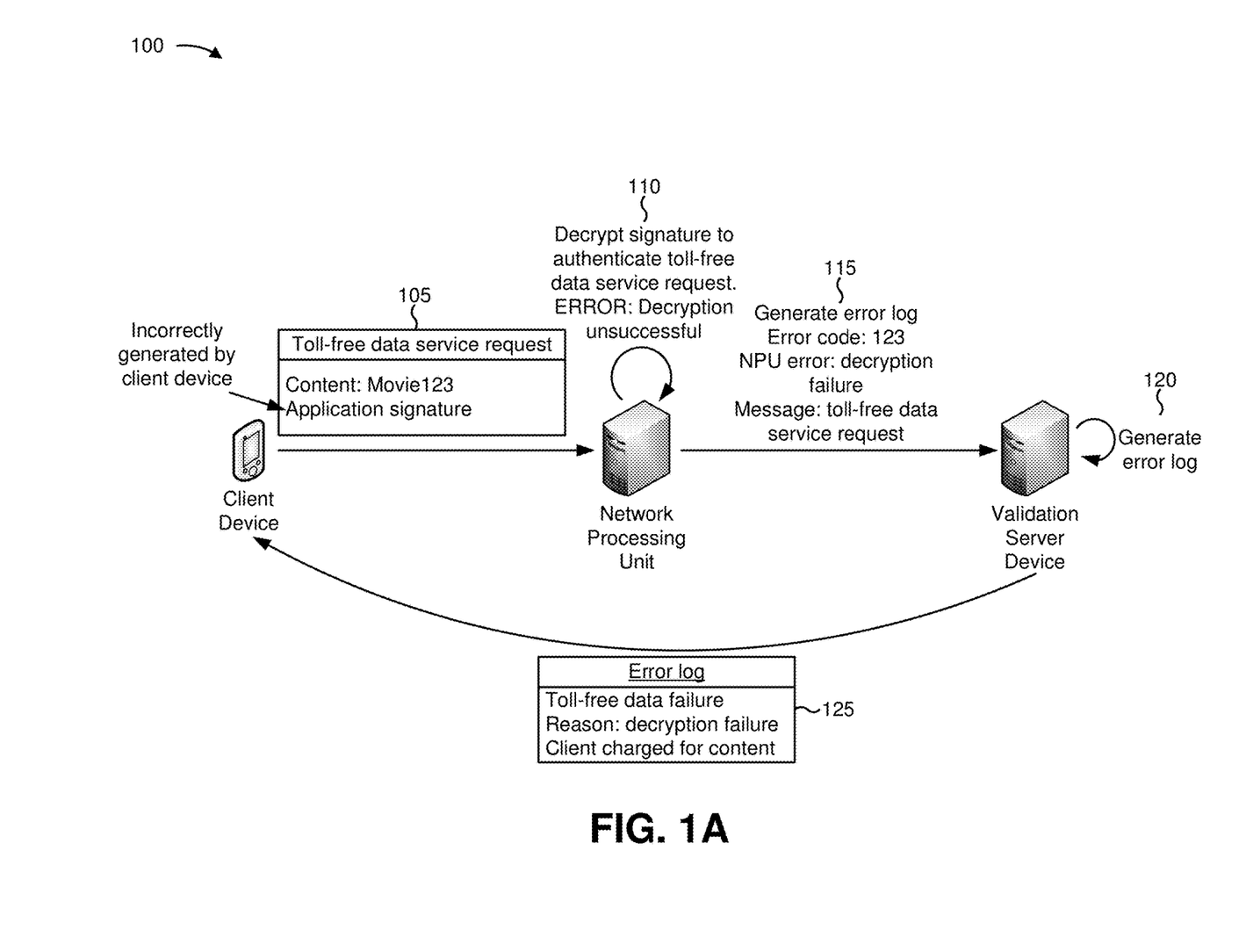
FIGS. 1A-1C are diagrams of an overview of an example implementation described herein.
Figure 1B:
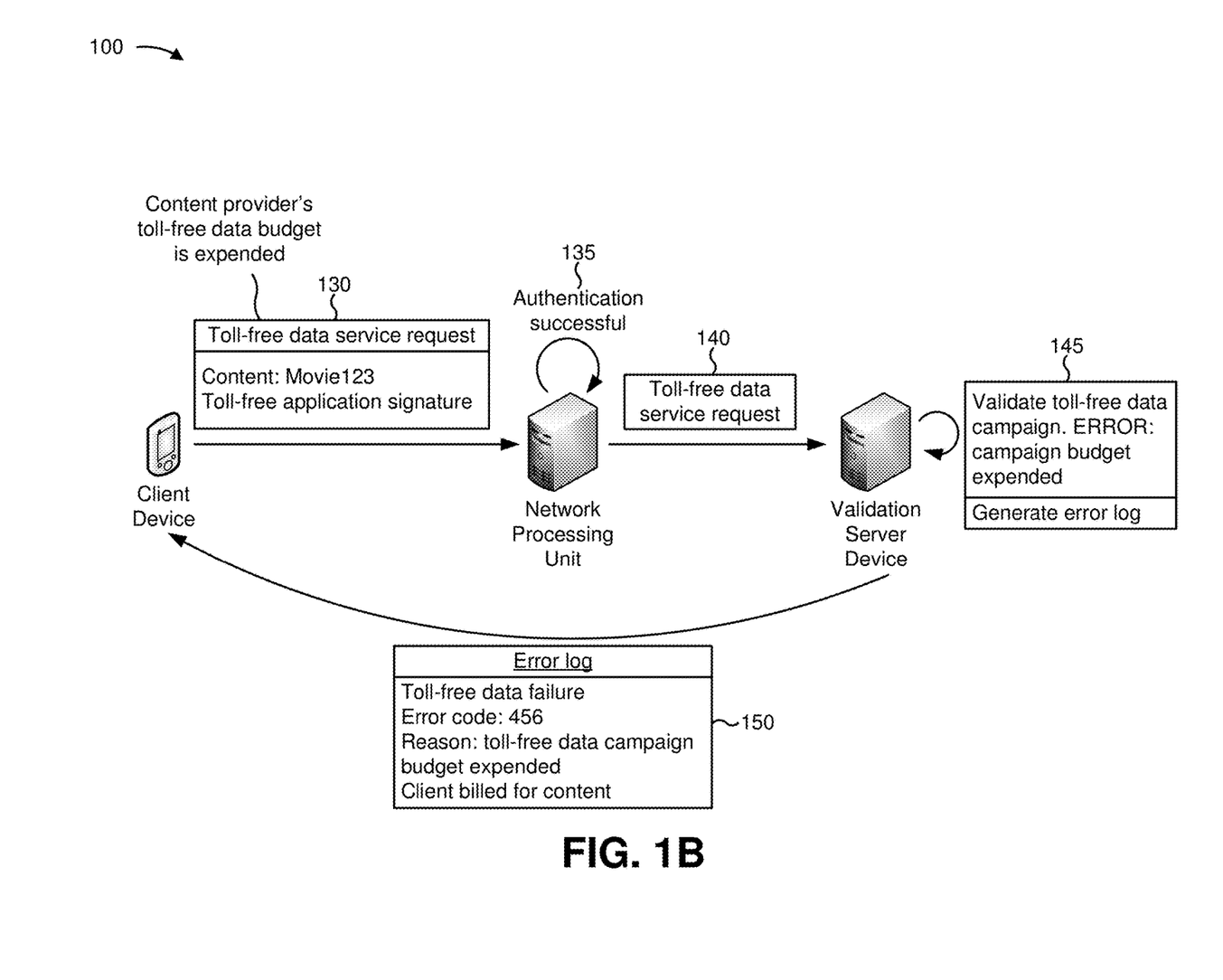
Figure 1C:
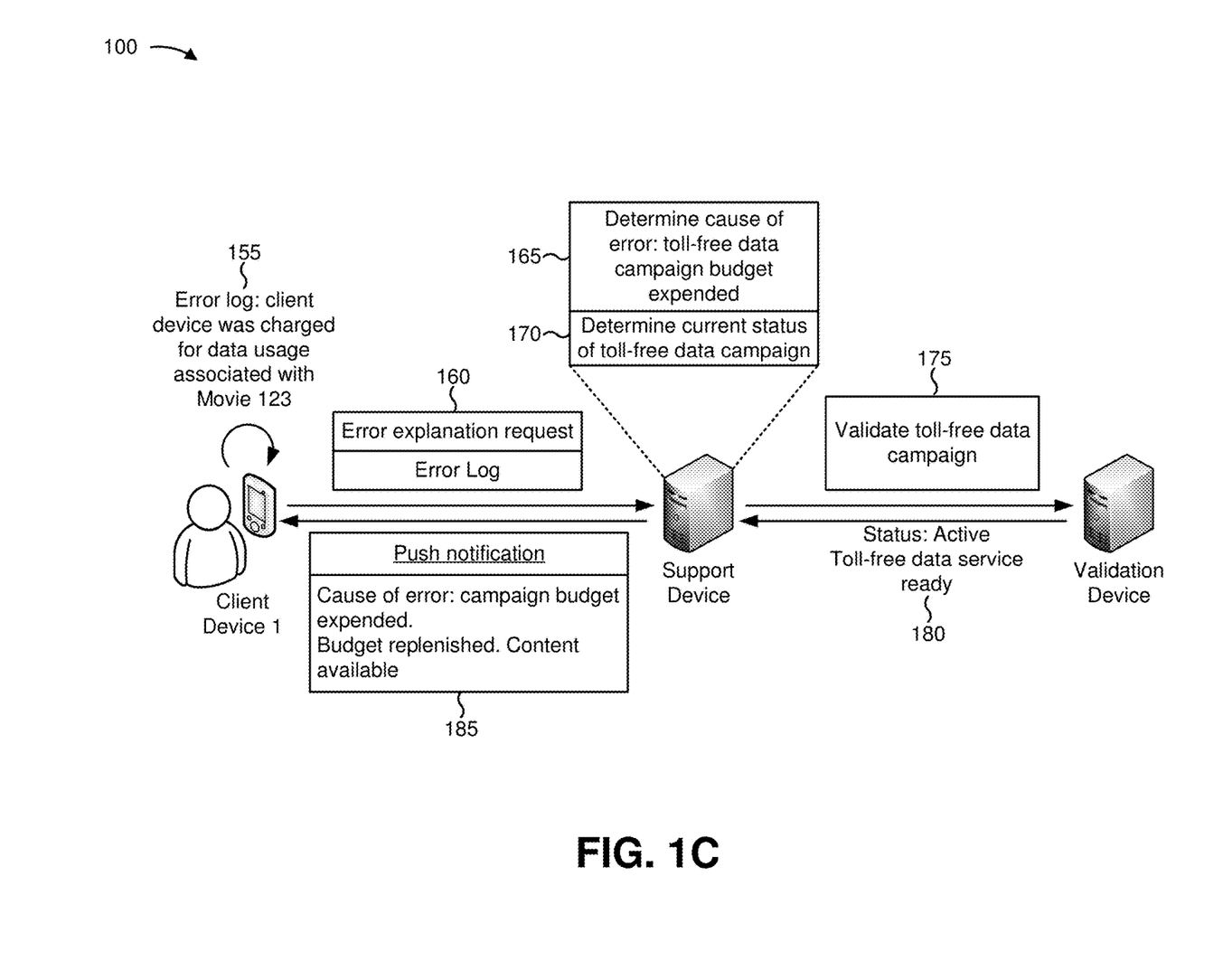

FIGS. 1A-1C are diagrams of an overview of an example implementation 100 described herein. As shown in FIG. 1A, and by reference number 105, a client device may provide a toll-free data service request to a network processing unit. As shown, the toll-free data service request may identify toll-free content that the client device is attempting to access, and may include an application signature. The application signature may identify the client device, may identify an application on which the client device is attempting to access the toll-free content, and/or other information. As shown, in this case, the application signature is incorrectly generated by the client device, which may cause the client device to be billed for accessing the toll-free content, as described in more detail below.

As shown by reference number 110, the network processing unit may decrypt the application signature to authenticate the toll-free data service request. For example, the network processing unit may authenticate the toll-free data service request by determining whether the network processing unit can decrypt the application signature, and may fail to authenticate the toll-free data service request when the network processing unit cannot decrypt the application signature. Additionally, or alternatively, the network processing unit may compare information included in the application signature to expected information (e.g., a device identifier associated with the client device, an application identifier associated with the application, a cryptographic string, etc.) to authenticate the toll-free data service request. As shown, the network processing unit may fail to authenticate the application signature based on being unable to decrypt the application signature.

As shown by reference number 115, based on failing to authenticate the application signature, the network processing unit may cause a validation server to generate an error log. As further shown, the error log may include an error code of 123 (e.g., a string of one or more characters identifying an error type associated with failing to authenticate the application signature), an error description of "decryption failure," and information identifying a message associated with the error (e.g., the toll-free data service request). As shown by reference number 120, the validation device may generate the error log.

As shown by reference number 125, the validation device may provide the error log to the client device. As further shown, the error log may include information indicating that a failure has occurred with regard to the toll-free data service. As shown, the error log may identify a reason for the failure (e.g., "decryption failure") and may indicate that the client device is to be billed for data usage associated with the toll-free content if the client device accesses the toll-free content. In this way, the validation server notifies the client device of the failure, which permits the client device to stop accessing content for which the client device is billed, and thus conserves network resources.

As shown in FIG. 1B, and by reference number 130, the client device may provide another toll-free data service request to the network processing unit. In this case, the toll-free content (e.g., Movie 123) is associated with a toll-free data campaign with an expended budget. For example, a toll-free data service subscriber may specify a particular budget for the toll-free data service, and may be billed for data usage associated with the toll-free data service until the particular budget is expended.

As shown by reference number 135, the network processing unit may successfully authenticate the application signature included in the toll-free data service request (e.g., based on the application signature being successfully decrypted). As shown by reference number 140, based on successfully authenticating the application signature, the network processing unit may provide the toll-free data service request to the validation device.

As shown by reference number 145, the validation device may validate the toll-free data campaign associated with the toll-free content. That is, the validation device may determine whether the toll-free data campaign exists, whether the toll-free data campaign is active, whether the toll-free data campaign is associated with a budget and, if so, whether the budget has been expended, whether the toll-free data campaign is associated with blacklisted content, or the like. Here, based on the budget for the toll-free data campaign being expended, the validation device fails to validate the toll-free data campaign. As further shown, the validation device generates an error log based on failing to validate the toll-free data campaign.

As shown by reference number 150, the validation device may provide the error log to the client device. As further shown, the error log may indicate that a toll-free data failure has occurred, and may include an error code of 456 identifying an error type associated with the toll-free data failure. As shown, the error log may identify a reason for the error (e.g., "toll-free data campaign budget expended"), and may indicate that the client device is to be billed for accessing the toll-free content if the client device accesses the content. In this way, the validation server notifies the client device of the failure, which permits the client device to stop accessing content for which the client device is billed, thus conserving network resources.

For the purpose of FIG. 1C, assume that the operations described in connection with FIG. 1B have been performed. That is, assume that the validation device has determined that the toll-free data campaign associated with Movie 123 is invalid based on a budget for the toll-free data campaign being expended, and assume that the validation device has provided the error log relating to the error to the client device.

As shown in FIG. 1C, and by reference number 155, a user of the client device may check the error log to determine that the client device has been billed for data usage when accessing toll-free content. Assume that the client device continued to access the content despite receiving the error, and was billed accordingly. As shown, the client device was billed for data usage when accessing Movie 123, as described in connection with FIG. 1B, above. As shown by reference number 160, the client device may transmit an error explanation request to the support device. For example, the client device may transmit the error explanation request based on receiving a user interaction to cause the client device to transmit the error explanation request. As further shown, the error explanation request may include the error log. In some implementations, the error explanation request may identify the error log, and the support device may obtain the error log (e.g., from local storage, from the validation device, etc.).

As shown by reference number 165, the support device may determine a cause of the error with regard to Movie 123 based on the error log. As shown, the support device determines that the client device was billed for the toll-free content based on the budget for the toll-free data campaign being expended. As shown by reference number 170, the support device may determine an updated status of the toll-free data campaign.

As shown by reference number 175, to determine the updated status of the toll-free data campaign, the support device may cause the validation device to validate the toll-free data campaign. As further shown, the validation device may determine that the toll-free data campaign is active and adequately funded. That is, the validation device may determine that the toll-free data service subscriber will be billed if the client device accesses the toll-free content.

As shown by reference number 180, the validation device may provide information to the support device indicating the updated status of the toll-free data campaign. Here, the information indicates that the toll-free data campaign is active and the toll-free content is ready to access. As shown by reference number 190, based on the information indicating the status of the toll-free data campaign, the support device may provide a push notification to the client device. The push notification may identify a cause of the error (e.g., the campaign budget being expended) and an updated status of the toll-free data campaign (e.g., "Budget replenished. Content available").

In this way, a support device determines a cause of an error associated with accessing toll-free content and determines an updated status of a toll-free data campaign associated with the toll-free content. By providing the cause of the error and the updated status to a client device, the support device improves a likelihood of the client device accessing toll-free content. In some implementations, the support device may reconfigure one or more network devices based on the cause of the error, which improves network functionality.

Figure 2:
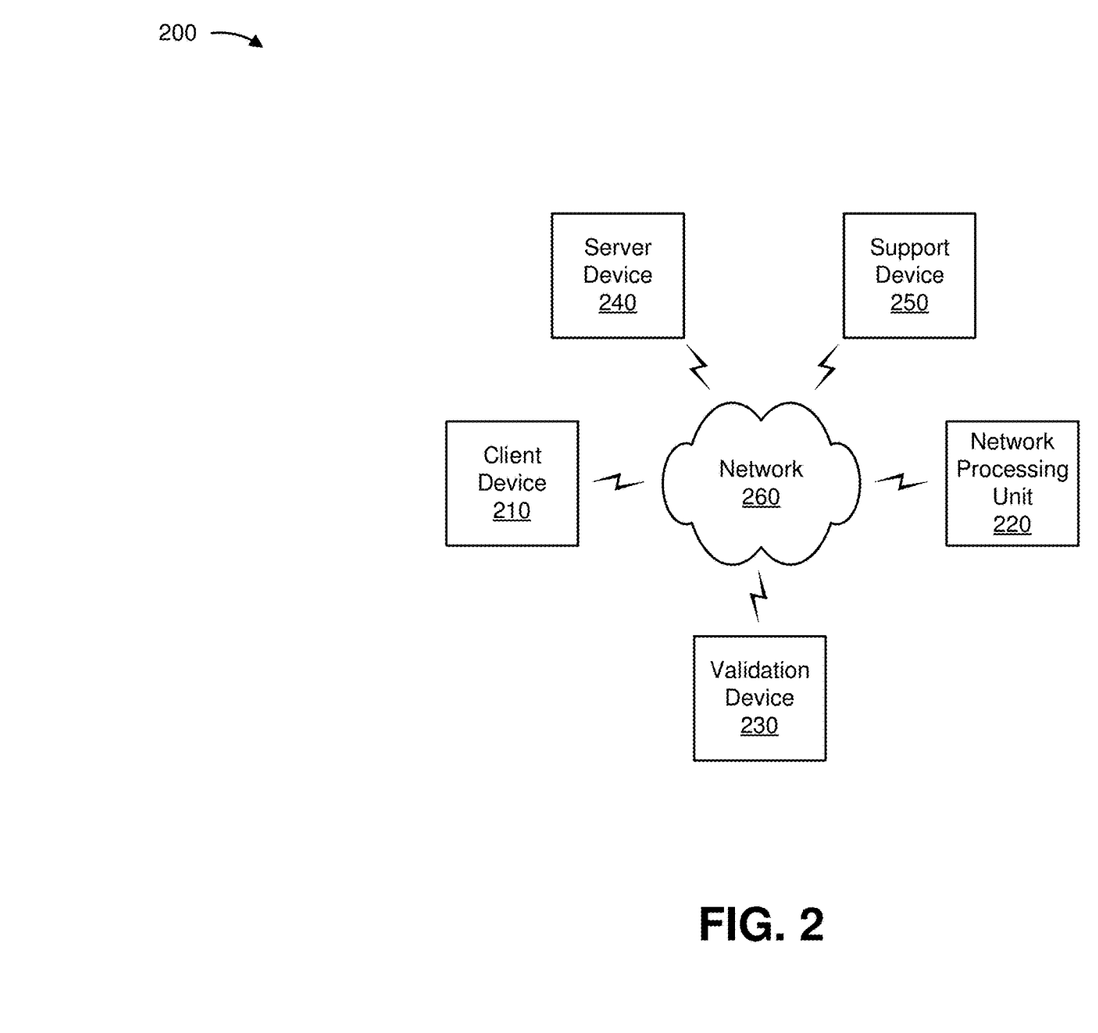
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a network processing unit 220, a validation device 230, a server device 240, a support device 250, and a network 260. Devices of environment 200 may interconnect via wired connections, wireless connections, or a combination of wired and wireless connections.

Client device 210 may include one or more devices capable of receiving, generating, storing, processing, and/or providing information. For example, client device 210 may include a communication and computing device, such as a mobile phone (e.g., a smart phone, a radiotelephone, etc.), a laptop computer, a tablet computer, a handheld computer, a set-top box, a gaming device, a wearable communication device (e.g., a smart wristwatch, a pair of smart eyeglasses, etc.), or a similar type of device. In some implementations, client device 210 may receive information from and/or transmit information to another device in environment 200.

Network processing unit 220 may include one or more devices capable of receiving, processing, storing, and/or transferring traffic associated with network 260. For example, network processing unit 220 may include a server, a gateway, a firewall, a router, a switch, a hub, or a similar device. In some implementations, network processing unit 220 may include one or more components of a base station of network 260. In some implementations, network processing unit 220 may receive information from and/or transmit information to another device in environment 200.

Validation device 230 may include one or more devices capable of receiving, storing, generating, processing, and/or providing information. For example, validation device 230 may include a server, a gateway, a firewall, a router, a switch, a hub, or a similar device. In some implementations, validation device 230 may include a communication interface that allows validation device 230 to receive information from and/or transmit information to other devices in environment 200.

Server device 240 may include one or more devices capable of receiving, storing, and/or providing information. For example, server device 240 may include a server, or a similar device. In some implementations, server device 240 may include a communication interface that allows server device 240 to receive information from and/or transmit information to other devices in environment 200.

Support device 250 may include one or more devices capable of receiving, storing, generating, processing, and/or providing information. For example, support device 250 may include a server, or a similar device. In some implementations, support device 250 may include a communication interface that allows support device 250 to receive information from and/or transmit information to other devices in environment 200.

Network 260 may include one or more wired and/or wireless networks. For example, network 260 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
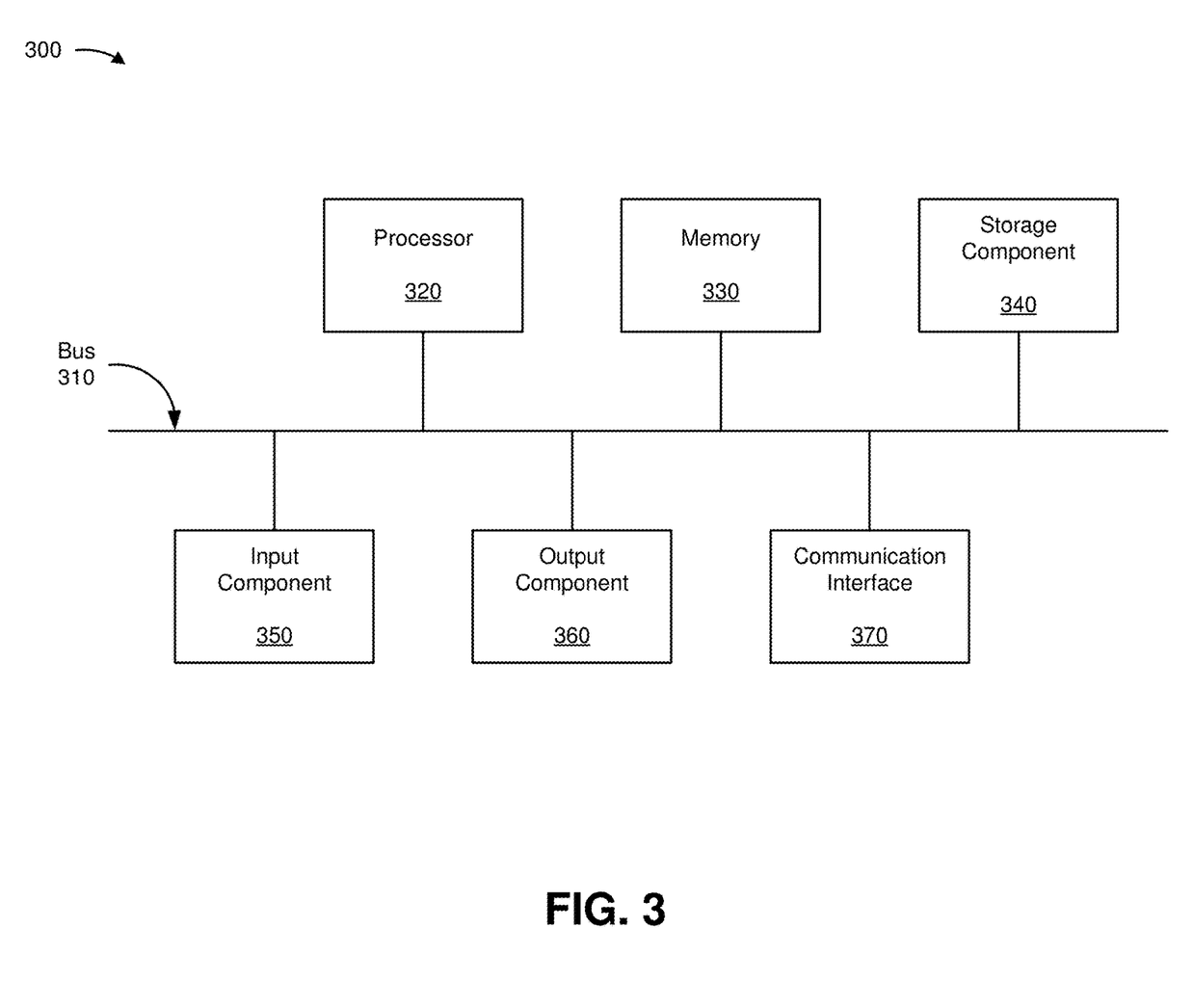
FIG. 3 is a diagram of example components of one or more devices of FIG. 2.

FIG. 3 is a diagram of example components of a device 300. Device 300 may correspond to client device 210, network processing unit 220, validation device 230, server device 240, and/or support device 250. In some implementations, client device 210, network processing unit 220, validation device 230, server device 240, and/or support device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
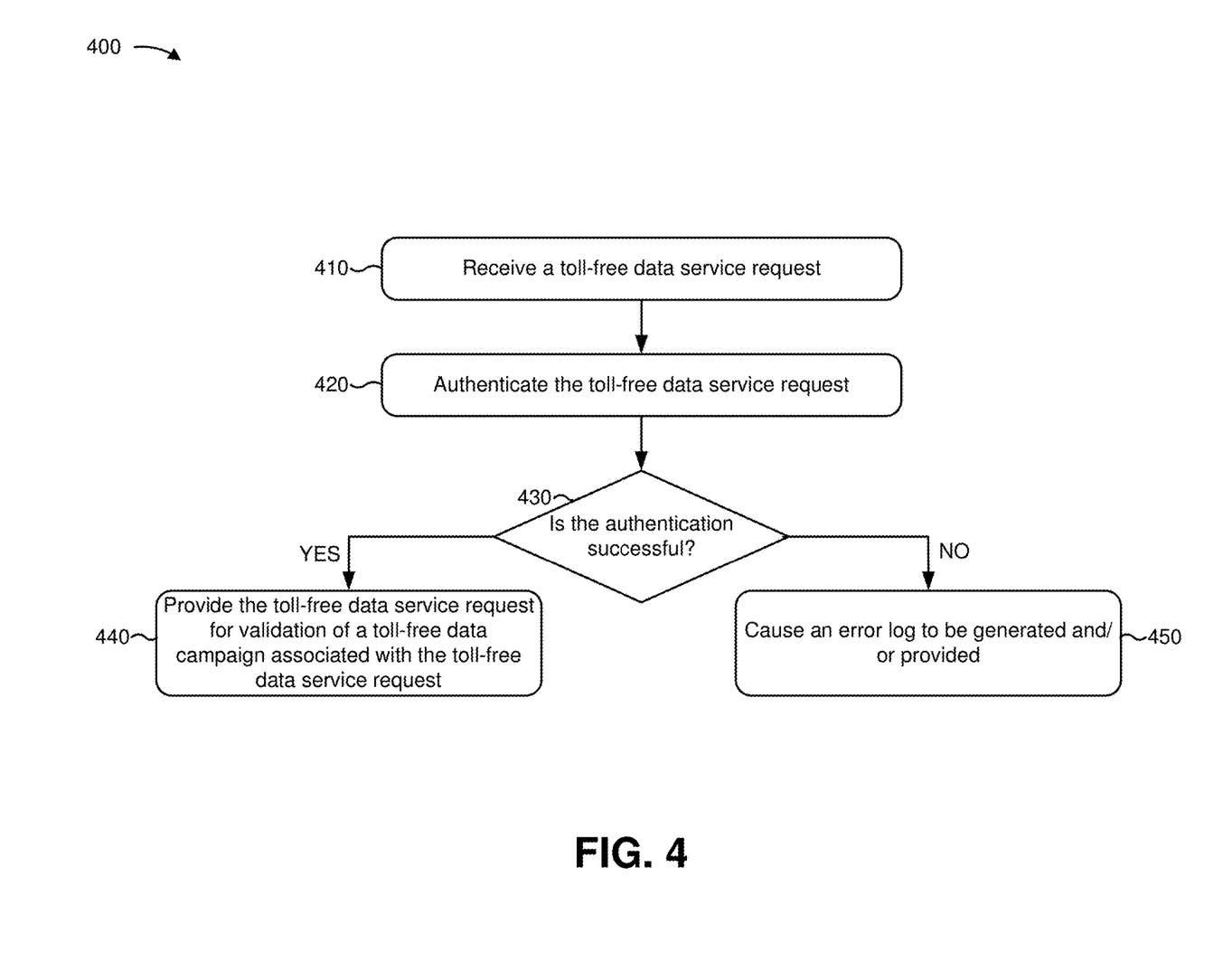
FIG. 4 is a flow chart of an example process for authenticating a toll-free data service request.

FIG. 4 is a flow chart of an example process 400 for authenticating a toll-free data service request. In some implementations, one or more process blocks of FIG. 4 may be performed by network processing unit 220. In some implementations, one or more process blocks of FIG. 4 may be performed by another device or a group of devices separate from or including network processing unit 220, such as client device 210, validation device 230, server device 240, and/or support device 250.

As shown in FIG. 4, process 400 may include receiving a toll-free data service request (block 410). For example, network processing unit 220 may receive a toll-free data service request from client device 210. The toll-free data service request may identify toll-free content that client device 210 is attempting to access. For example, a user of client device 210 may attempt to access toll-free content (e.g., via an application on client device 210), and client device 210 may transmit the toll-free data service request based on the user attempting to access the toll-free content. The toll-free data service request may request that validation device 230 bill a toll-free data service subscriber for data usage by client device 210 when accessing the toll-free content.

In some implementations, the toll-free data service request may include an application signature. The application signature may include information for use by network processing unit 220 to authenticate the toll-free data service request. For example, the application signature may identify a particular client device 210, a particular user of a client device, 210, and/or a particular application that is authorized to transmit the toll-free data service request. In some implementations, the application signature may be encrypted. For example, client device 210 or another device (e.g., validation device 230, etc.) may generate the application signature by applying a digital signature algorithm, an encryption algorithm, or the like, to a set of information (e.g., the particular device identifier, the particular user identifier, the particular application identifier, an encryption string, etc.). In some implementations, client device 210 may generate the application signature based on an encryption string (e.g., a random salt, a cryptographic pepper, a padding value, etc.).

As further shown in FIG. 4, process 400 may include authenticating the toll-free data service request (block 420). For example, network processing unit 220 may authenticate the toll-free data service request. In some implementations, network processing unit 220 may authenticate the toll-free data service request based on an application signature included in the toll-free data service request. For example, network processing unit 220 may attempt to decrypt the application signature, and may authenticate the toll-free data service request based on whether decrypting the application signature is successful.

Additionally, or alternatively, network processing unit 220 may authenticate the toll-free data service request based on information included in the toll-free data service request and/or the application identifier. For example, assume that an application signature in a toll-free data service request includes a device identifier that is associated with a particular client device 210 and an application identifier that is associated with a particular application. Assume further that network processing unit 220 receives the toll-free data service request from the particular client device 210 and the particular application. In that case, network processing unit 220 may successfully authenticate the toll-free data service request. Now, assume that network processing unit 220 receives the toll-free data service request from a different client device 210 and/or application. In that case, network processing unit 220 may fail to authenticate the toll-free data service request.

As further shown in FIG. 4, process 400 may include determining whether the authentication is successful (block 430). If the authentication is successful (block 430—YES), process 400 may include providing the toll-free data service request for validation of a toll-free data campaign associated with the toll-free data service request (block 440). For example, if the authentication is successful (e.g., if network processing unit 220 successfully decrypts the application signature, and/or if information included in the application signature matches stored client device 210, user, and/or the application identification information provided in the toll-free data service request), network processing unit 220 may provide the toll-free data service request to validation device 230 for validation. Validation device 230 may validate the toll-free data campaign associated with the toll-free data service request and/or the toll-free content, as described in more detail in connection with FIG. 5, below.

As further shown in FIG. 4, if the authentication is unsuccessful (block 430—NO), process 400 may include causing an error log to be generated and/or provided (block 450). For example, if network processing unit 220 fails to authenticate the toll-free data service request and/or the application signature, network processing unit 220 may cause an error log to be generated and/or provided. In some implementations, network processing unit 220 may cause validation device 230 to generate the error log. For example, network processing unit 220 may provide information identifying a cause of the failure to authenticate (e.g., a port mismatch between a port number associated with the toll-free data service and a port number on which the toll-free data service request was received, a hash mismatch between an expected hash of the toll-free data service request and a received hash of the toll-free data service request, a failure to decrypt the application signature, a partial or total package loss of information associated with the toll-free data service request, etc.), information identifying the toll-free data service request, or the like.

In some implementations, network processing unit 220 may generate the error log. For example, network processing unit 220 may identify a cause of the failure to authenticate, and may generate the error log based on the cause. In such cases, network processing unit 220 may store and/or provide the error log (e.g., to client device 210, to validation device 230, to server device 240, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
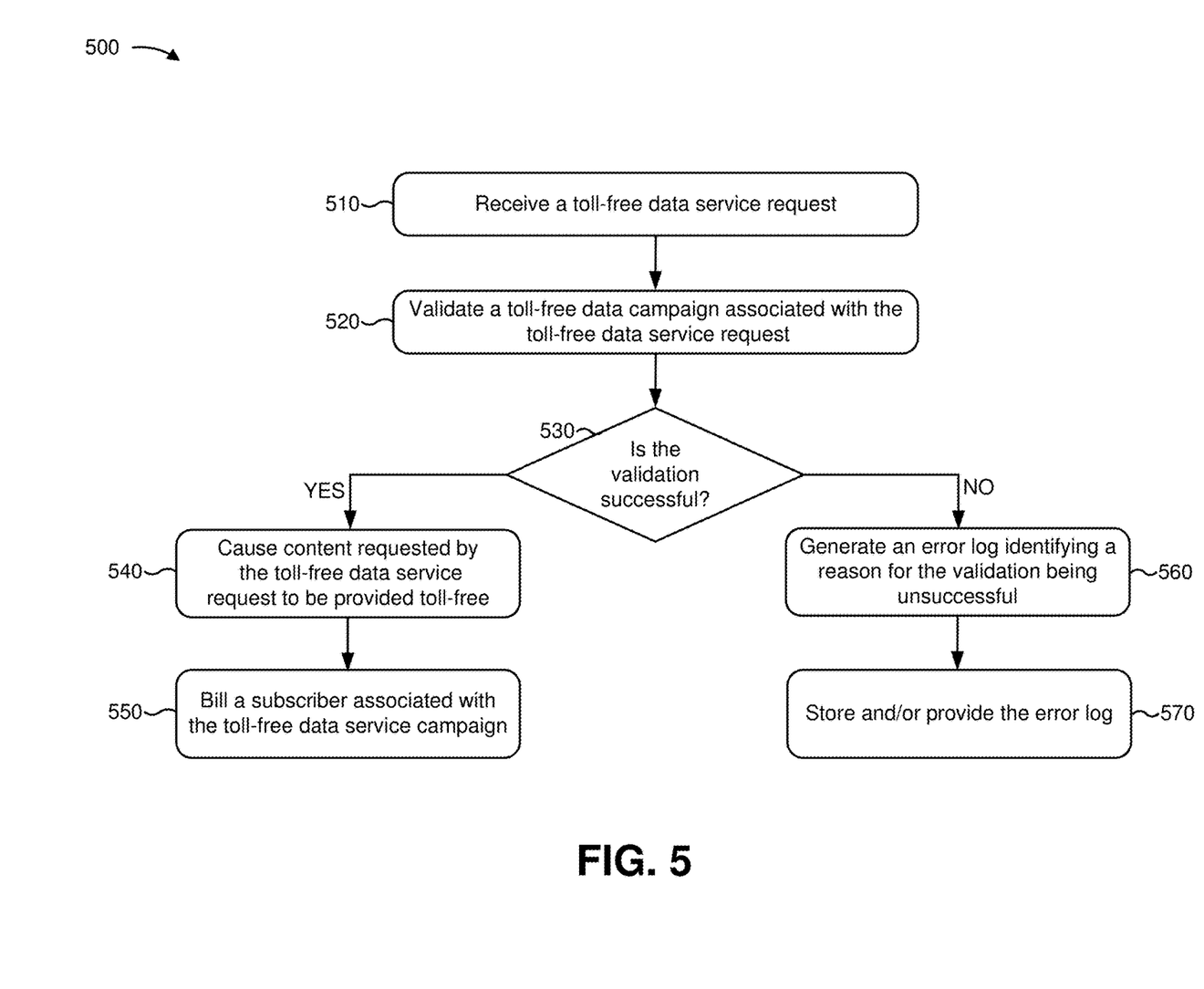
FIG. 5 is a flow chart of an example process for validating a toll-free data campaign based on a toll-free data service request.

FIG. 5 is a flow chart of an example process 500 for validating a toll-free data campaign based on a toll-free data service request. In some implementations, one or more process blocks of FIG. 5 may be performed by validation device 230. In some implementations, one or more process blocks of FIG. 5 may be performed by another device or a group of devices separate from or including validation device 230, such as client device 210, network processing unit 220, server device 240, and/or support device 250.

As shown in FIG. 5, process 500 may include receiving a toll-free data service request (block 510). For example, validation device 230 may receive a toll-free data service request. Validation device 230 may receive the toll-free data service request from network processing unit 220. For example, network processing unit 220 may authenticate the toll-free data service request, and may provide the toll-free data service request to validation device 230.

As further shown in FIG. 5, process 500 may include validating a toll-free data campaign associated with the toll-free data service request (block 520). For example, validation device 230 may validate a toll-free data campaign associated with the toll-free data service request. To validate the toll-free data campaign, validation device 230 may determine whether the toll-free data campaign is valid. For example, validation device 230 may determine whether the toll-free data campaign exists, whether the toll-free data campaign is active (e.g., providing toll-free content), whether a budget associated with the toll-free data campaign is expended, whether a webpage associated with the toll-free data campaign is blacklisted (e.g., based on a malicious webpage, a malicious subscriber, etc.), or the like.

As further shown in FIG. 5, process 500 may include determining whether the validation is successful (block 530). If the validation is successful (block 530—YES), process 500 may include causing content requested by the toll-free data service request to be provided (block 540). For example, if validation device 230 determines that the toll-free data campaign is valid, validation device 230 may cause the content requested by the toll-free data service request to be provided to client device 210. In some implementations, validation device 230 may grant client device 210 access to a particular webpage that includes the toll-free content. Additionally, or alternatively, validation device 230 may transmit the toll-free content to client device 210 (e.g., via network processing unit 220, etc.).

As further shown in FIG. 5, process 500 may include billing a subscriber associated with the toll-free data campaign (block 550). For example, validation device 230 may bill an entity (e.g., a subscriber) associated with the toll-free data campaign for data usage by client device 210 associated with accessing the toll-free content. In some implementations, validation device 230 may bill the subscriber based on a budget. For example, if the toll-free data campaign is associated with a particular budget, validation device 230 may bill the subscriber until the budget is expended, then may bill client device 210 for accessing the toll-free content.

As further shown in FIG. 5, if the validation is not successful (block 530—NO), process 500 may include generating an error log identifying a reason for the validation being unsuccessful (block 560). For example, if validation device 230 determines that the toll-free data campaign is invalid (e.g., does not exist, is associated with an expended budget, is inactive, is associated with blacklisted content, etc.), validation device 230 may generate an error log. The error log may include information identifying a reason that the toll-free data campaign is invalid. For example, the information may include a textual description of the error, a string of one or more characters, or the like. In some implementations, the error log may identify an entity that was billed for data usage associated with the toll-free content (e.g., a subscriber associated with the toll-free data campaign, a subscriber associated with client device 210, etc.).

In some implementations, validation device 230 may generate the error log based on an instruction from network processing unit 220. For example, when network processing unit 220 fails to authenticate a toll-free data service request, network processing unit 220 may provide an instruction to validation device 230 to generate the error log, and may provide information identifying a cause of the failure to authenticate. Validation device 230 may generate the error log based on the information identifying the cause. In this way, validation device 230 may generate an error log for network processing unit 220, which conserves processor resources of network processing unit 220.

As further shown in FIG. 5, process 500 may include storing and/or providing the error log (block 570). For example, validation device 230 may store and/or provide the error log. In some implementations, validation device 230 may provide the error log to client device 210. For example, validation device 230 may provide the error log for client device 210 to evaluate and/or store, as described in more detail below. In some implementations, validation device 230 may bill an entity (e.g., a subscriber) associated with client device 210 based on determining that the toll-free data campaign is invalid.

In some implementations, validation device 230 may compress the error log before providing the error log to client device 210, which conserves storage space of client device 210. In some implementations, client device 210 may compress and store the error log, which conserves processing resources of validation device 230. In some implementations, validation device 230 may store the error log locally and/or may provide the error log to another device to storage (e.g., server device 240, support device 250, etc.).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
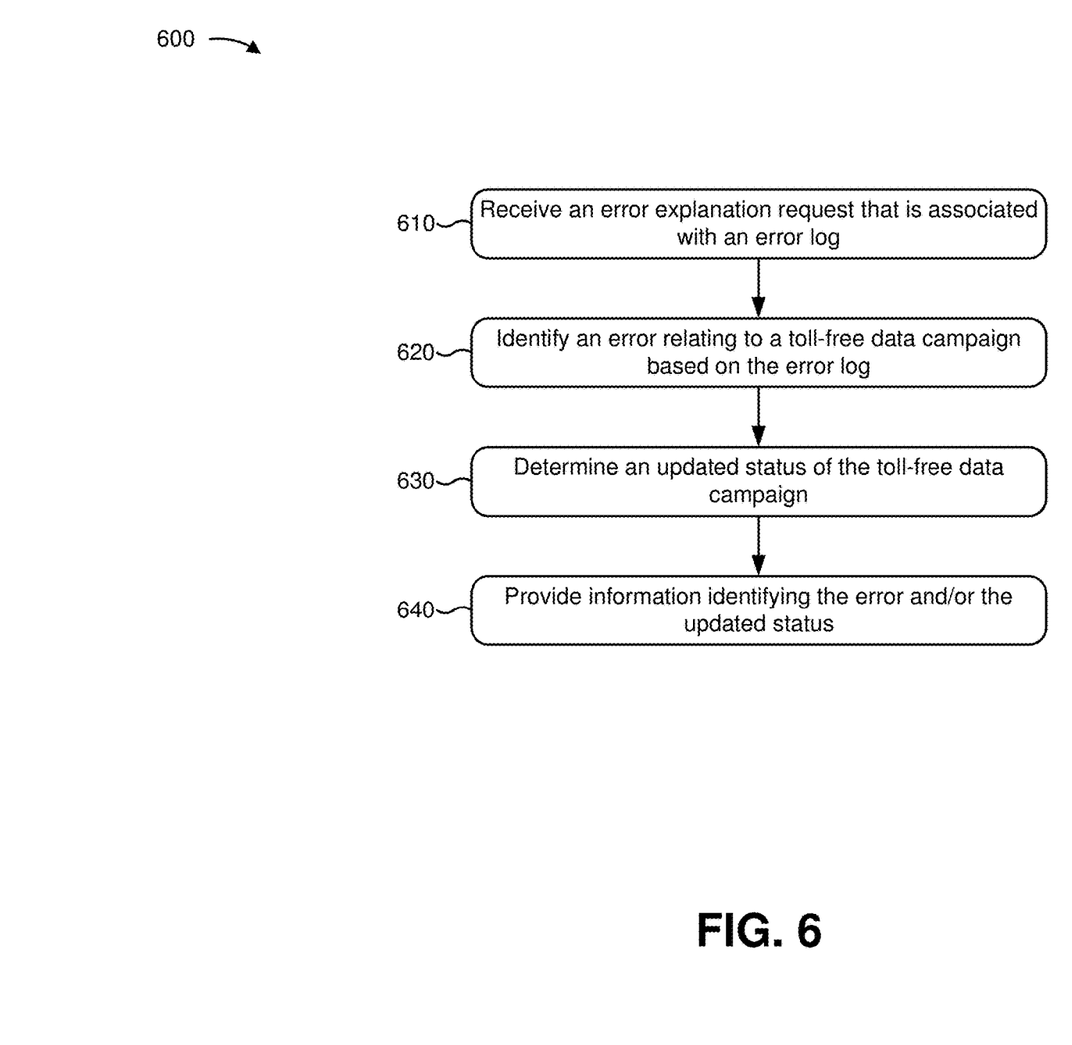
FIG. 6 is a flow chart of an example process for determining an error explanation for a toll-free data campaign.

FIG. 6 is a flow chart of an example process 600 for determining an error explanation for a toll-free data campaign. In some implementations, one or more process blocks of FIG. 6 may be performed by support device 250. In some implementations, one or more process blocks of FIG. 6 may be performed by another device or a group of devices separate from or including support device 250, such as client device 210, network processing unit 220, validation device 230, and/or server device 240.

As shown in FIG. 6, process 600 may include receiving an error explanation request that is associated with an error log (block 610). For example, support device 250 may receive an error explanation request. The error explanation request may be associated with an error log. For example, support device 250 may receive the error explanation request in association with the error log. Additionally, or alternatively, the error explanation request may identify the error log, and support device 250 may obtain the error log (e.g., from validation device 230, server device 240, etc.).

In some implementations, support device 250 may receive the error explanation request from client device 210. For example, a user of client device 210 may determine that client device 210 was billed for toll-free data usage with regard to toll-free content, and may cause client device 210 to transmit the error explanation request to support device 250. In some implementations, client device 210 may provide the error log with the error explanation request. For example, client device 210 may locally store the error log, and may provide the error log to support device 250. In such cases, client device 210 may compress the error log, which conserves storage space of client device 210 and/or network resources when transmitting the error log.

Additionally, or alternatively, support device 250 may receive the error log from another device (e.g., network processing unit 220, validation device 230, etc.). For example, the other device may provide the error log to support device 250 based on an error occurring in authentication and/or validation of a toll-free data service request. Support device 250 may identify the error, may determine an updated status of a toll-free data campaign associated with the toll-free data service request, and/or may provide an error explanation to client device 210 based on the error log, as described in more detail below. In this way, network processing unit 220 and/or validation device 230 may cause support device 250 to provide an error explanation to client device 210 automatically, which reduces processor usage by client device 210 to provide an error explanation request.

As further shown in FIG. 6, process 600 may include identifying an error relating to a toll-free data campaign based on the error log (block 620). For example, support device 250 may identify an error relating to a toll-free data campaign based on the error log. In some implementations, the error log may identify the error and/or may identify a cause for the error (e.g., an authentication error based on an application signature not being authenticated as described in FIG. 4, a validation error based on a toll-free data campaign being invalid as described in FIG. 5, etc.).

In some implementations, support device 250 may identify the error based on an error identifier in an error log. For example, assume that an error identifier indicates that a toll-free data campaign is associated with an expended budget. Support device 250 may determine that the particular toll-free data campaign is associated with an expended budget based on the error identifier, which conserves processor resources of network processing unit 220 and/or validation device 230. In some implementations, support device 250 may query a device for error information (e.g., network processing unit 220, validation device 230, etc.), which conserves storage resource of client device 210 that may otherwise be used to store the error information.

As further shown in FIG. 6, process 600 may include determining an updated status of the toll-free data campaign (block 630). For example, support device 250 may determine an updated status of the toll-free data campaign associated with the error log. In some implementations, support device 250 may obtain the updated status from another device (e.g., network processing unit 220, validation device 230, etc.). For example, assume that an error for a toll-free data campaign is related to validation of the toll-free data campaign. In that case, support device 250 may obtain an updated status for the toll-free data campaign from validation device 230. As another example, assume that an error for a toll-free data campaign is related to authentication of the toll-free data service request. In that case, support device 250 may obtain an updated status from network processing unit 220.

In some implementations, support device 250 may obtain an updated status from validation device 230 based on causing validation device 230 to validate a toll-free data campaign. For example, support device 250 may provide information identifying a toll-free data campaign to validation device 230, and validation device 230 may validate the toll-free data campaign. When validation device 230 successfully validates the toll-free data campaign, support device 250 may determine an updated status indicating that the toll-free data campaign is valid. When validation device 230 determines that the toll-free data campaign is invalid, support device 250 may determine an updated status indicating that the toll-free data service is invalid (e.g., that client device 210 will be billed for toll-free data usage associated with the toll-free data campaign).

In some implementations, support device 250 may obtain an updated status from network processing unit 220 based on causing network processing unit 220 to authenticate a toll-free data service request associated with client device 210. For example, support device 250 may receive a toll-free data service request in association with an error log, and may provide the toll-free data service request to network processing unit 220. Network processing unit 220 may authenticate the toll-free data service request. Based on a result of the authentication, support device 250 may determine the updated status. For example, if the authentication is unsuccessful based on an application signature for the toll-free data service request being outdated, support device 250 may determine an updated status indicating that client device 210 is associated with an outdated application signature.

As further shown in FIG. 6, process 600 may include providing information identifying the error and/or the updated status (block 640). For example, support device 250 may provide information identifying the error and/or the updated status for the toll-free data campaign. In some implementations, support device 250 may provide an error explanation. For example, support device 250 may generate an error explanation that describes the error and the updated status (e.g., "Cause of error: campaign budget expended. Budget replenished. Content available," as described in FIG. 1C, or another type of message). In some implementations, support device 250 may cause the information identifying the error and/or the updated status to be provided to client device 210 in a push notification, which improves network security by reducing a likelihood of an unauthorized device intercepting the information. In some implementations, support device 250 may provide the information identifying the error and/or the updated status to a subscriber associated with the toll-free data campaign. Additionally, or alternatively, support device 250 may provide the information identifying the error and/or the updated status to another device (e.g., network processing unit 220, validation device 230, a billing device, a network engineer, etc.).

In some implementations, the error explanation may identify the error and the updated status. For example, when authentication for a toll-free data service request is unsuccessful, support device 250 may generate an error explanation indicating that authentication was unsuccessful, and indicating a current status of the authentication. In some implementations, the error explanation may include an error identifier (e.g., an error code, a string of one or more characters uniquely identifying the error, etc.). In some implementations, the error explanation may include a description of the error. For example, when authentication is unsuccessful, the error explanation may include a string, such as "Authentication of the client device failed," "Your application signature is out of date," "Content data lost," or the like.

In some implementations, support device 250 may generate an error explanation based on a machine learning algorithm. For example, support device 250 may train a machine learning algorithm based on known inputs (e.g., error logs, toll-free data service requests, updated statuses, errors, etc.) and known outputs (e.g., error explanations). The machine learning algorithm may output an error explanation based on input information, such as an error log, a toll-free data service request, an updated status, an error, or the like. For example, the machine learning algorithm may generate a plain-text description of the input information.

In some implementations, support device 250 may refine a machine learning algorithm based on feedback from client devices 210. For example, client devices 210 may provide information indicating whether error explanations, generated by the machine learning algorithm, are helpful for users of the client devices 210 (e.g., based on a user interface presented in association with the error explanation, based on a feedback request, etc.). When the information indicates that a particular error explanation is helpful, support device 250 may configure the machine learning algorithm to generate error explanations based on the particular error explanation. When the information indicates that a particular error explanation is not helpful, support device 250 may configure the machine learning algorithm to avoid generating error explanations resembling the particular error explanation. In this way, support device 250 generates error explanations based on a machine learning algorithm, which improves accuracy of the error explanations and conserves processor and/or storage resources that may otherwise be used to store rules for generating error explanations.

In some implementations, support device 250 may generate an error explanation based on a rule. For example, a network administrator, an application provider, another device (e.g., network processing unit 220, validation device 230, etc.), or the like may specify rules for generating error explanations. A rule may include one or more conditions, and may specify an error explanation to generate and/or provide when the one or more conditions are met. As an example, a rule might specify that when an authentication error is caused by a port mismatch, support device 250 is to generate an error explanation of "Error: Port mismatch based on application configuration. Contact application provider." As another example, a rule might specify that when a validation error is caused by an inactive toll-free data campaign, support device 250 is to generate an error explanation of "Error: Content is no longer sponsored by toll-free data service subscriber." In this way, support device 250 may generate error explanations based on rules, which conserves processor resources of support device 250 that may otherwise be used to generate error explanations based on a machine learning algorithm, or another approach.

In some implementations, support device 250 may cause one or more devices to be reconfigured based on the error explanation. For example, assume that the error explanation identifies a port mismatch between a port associated with toll-free data services and a port on which network processing unit 220 received a toll-free data service request. In that case, support device 250 may cause client device 210 to be reconfigured to transmit the toll-free data service request to the port associated with toll-free data services. Additionally, or alternatively, support device 250 may reconfigure network processing unit 220 to associate the port on which network processing unit 220 received the toll-free data service request with toll-free data services. In this way, support device 250 causes a device to be reconfigured based on an error explanation, which improves network functionality and thereby conserves network resources.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, a support device determines a cause of an error associated with accessing toll-free content and determines a current status of a toll-free data campaign associated with the toll-free content. By providing the cause of the error and the current status to a client device, the support device improves a likelihood of the client device accessing toll-free content. In some implementations, the support device may reconfigure one or more network devices based on the cause of the error, which improves network functionality.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
a memory; and
one or more processors to:
receive an error log and an error explanation request,
the error log including information identifying an error associated with a user device accessing content that is associated with a toll-free data campaign,
the toll-free data campaign associated with a toll-free data service subscriber subsidizing a cost of network data usage by the user device instead of charging a user associated with the user device for accessing the content, and
the toll-free data campaign associated with a bill being received by the toll-free data service subscriber for the user device accessing the content when the toll-free data campaign is active and funded, and the error explanation request being based on the bill being received by the user for the user device accessing the content;
determine a cause of the error based on the error log,
the one or more processors, when determining the cause of the error, being to:
identify an error identifier in the error log,
the error identifier indicating whether the cause of the error is one or more of an authentication error or a validation error,
the authentication error occurring when there is a hash mismatch between an expected hash associated with a toll-free data service request for the toll-free data campaign and a received hash associated with the toll-free data service request for the toll-free data campaign, and
the validation error occurring when the toll-free data campaign is invalid or inactive, and
determine the cause of the error based on the error identifier;
determine a second device associated with the cause of the error;
determine an updated status of the toll-free data campaign based on information received from the second device;
generate an error explanation based on the cause of the error and the updated status of the toll-free data campaign,
the error explanation identifying the cause of the error and the updated status of the toll-free data campaign; and
cause the error explanation to be provided to the user device.

2. The first device of claim 1, where the one or more processors, when generating the error explanation, are to:
generate the error explanation based on a machine learning algorithm.

3. The first device of claim 1, where the one or more processors, when determining the updated status of the toll-free data campaign, are to:
determine the updated status of the toll-free data campaign based on receiving the error explanation request.

4. The first device of claim 1, where the one or more processors, when receiving the error explanation request, are to:
receive the error explanation request based on an entity associated with the user device being billed for accessing the content.

5. The first device of claim 1, where the one or more processors, when receiving the error log, are to:
receive the error explanation request,
the error explanation request identifying the error log; and
obtain the error log based on the error explanation request identifying the error log.

6. The first device of claim 1, where the one or more processors, when receiving the error log, are to:
receive the toll-free data service request; and
where the one or more processors, when determining the cause of the error, are to:
determine the cause of the error based on the toll-free data service request.

7. The first device of claim 1, where the one or more processors are further to:
cause information identifying the error and the updated status of the toll-free data campaign to be provided to the user device in a push notification.

8. A non-transitory computer-readable medium storing instructions, the instructions comprising:
one or more instructions that, when executed by one or more processors of a first device, cause the one or more processors to:
receive an error log and an error explanation request,
the error log including information identifying an error associated with a user device accessing content that is associated with a toll-free data campaign,
the toll-free data campaign associated with a toll-free data service subscriber subsidizing a cost of network data usage by the user device instead of charging a user associated with the user device for accessing the content, and
the toll-free data campaign associated with a bill being received by the toll-free data service subscriber for the user device accessing the content when the toll-free data campaign is active and funded, and
the error explanation request being based on the bill being received by the user for the user device accessing the content;
determine a cause of the error based on the error log,
the one or more instructions, that cause the one or more processors to determine the cause of the error, causing the one or more processors to:
identify an error identifier in the error log,
the error identifier indicating whether the cause of the error is one or more of an authentication error or a validation error,
the authentication error occurring when there is a hash mismatch between an expected hash associated with a toll-free data service request for the toll-free data campaign and a received hash associated with the toll-free data service request for the toll-free data campaign, and
the validation error occurring when the toll-free data campaign is invalid or inactive, and
determine the cause of the error based on the error identifier;
determine a second device associated with the cause of the error;
determine an updated status of the toll-free data campaign based on information received from the second device; and
cause information identifying the cause of the error and the updated status of the toll-free data campaign to be provided to the user device.

9. The non-transitory computer-readable medium of claim 8, where the validation error includes one or more of:
an error relating to the toll-free data campaign not being found,
an error relating to the toll-free data campaign being inactive,
an error relating to the toll-free data campaign being associated with an expended budget, or
an error relating to the content being associated with a blacklist.

10. The non-transitory computer-readable medium of claim 8, where the one or more instructions, that cause the one or more processors to determine the updated status of the toll-free data campaign, cause the one or more processors to:
cause the toll-free data campaign to be validated; and determine the updated status of the toll-free data campaign based on causing the toll-free data campaign to be validated.

11. The non-transitory computer-readable medium of claim 8, where the one or more instructions, that cause the one or more processors to determine the updated status of the toll-free data campaign, cause the one or more processors to:
determine the updated status of the toll-free data campaign based on receiving the error explanation request, the error explanation request being received from the user device.

12. The non-transitory computer-readable medium of claim 11, where the one or more instructions, that cause the one or more processors to determine the updated status of the toll-free data campaign, cause the one or more processors to:
cause the toll-free data service request to be authenticated to determine the updated status of the toll-free data campaign.

13. The non-transitory computer-readable medium of claim 8, where the one or more instructions, when executed by the one or more processors, further cause the one or more processors to:
train a machine learning algorithm based on the error log; and
generate an error explanation based on the machine learning algorithm.

14. The non-transitory computer-readable medium of claim 8, where the one or more instructions, when executed by the one or more processors, further cause the one or more processors to:
generate, based on the cause of the error, an error explanation based on a machine learning algorithm;
receive, via a user interface associated with the user device, feedback information indicating whether the error explanation is helpful; and
configure the machine learning algorithm to generate one or more other error explanations resembling the error explanation based on the feedback information indicating that the error explanation is helpful.

15. A method, comprising:
receiving, by a first device, an error log and an error explanation request,
the error log including information identifying an error associated with a user device accessing content associated with a toll-free data campaign,
the toll-free data campaign associated with a toll-free data service subscriber subsidizing a cost of network data usage by the user device instead of charging a user associated with the user device for accessing the content, and
the toll-free data campaign associated with a bill being received by the toll-free data service subscriber for the user device accessing the content when the toll-free data campaign is active and funded, and
the error explanation request being based on the bill being received by the toll-free data service subscriber for the user device accessing the content;
determining, by the first device, a cause of the error based on the error log,
where determining the cause of the error comprises:
identifying an error identifier in the error log,
the error identifier indicating whether the cause of the error is one or more of an authentication error or a validation error,
the authentication error occurring when there is a hash mismatch between an expected hash associated with a toll-free data service request for the toll-free data campaign and a received hash associated with the toll-free data service request for the toll-free data campaign, and
the validation error occurring when the toll-free data campaign is invalid or inactive, and
determining the cause of the error based on the error identifier;
determining, by the first device, a second device associated with the cause of the error;
determining, by the first device, an updated status of the toll-free data campaign based on information received from the second device;
generating, by the first device, an error explanation based on the cause of the error and the updated status of the toll-free data campaign,
the error explanation identifying the cause of the error and the updated status of the toll-free data campaign; and
causing, by the first device, the error explanation to be provided to the user device.

16. The method of claim 15,
where determining the updated status of the toll-free data campaign comprises:
determining the updated status of the toll-free data campaign based on receiving the error explanation request,
the error explanation request being received from the user device.

17. The method of claim 15, further comprising:
receiving the error explanation request from the user device based on an entity associated with the user device being billed for accessing the content.

18. The method of claim 15, where generating the error explanation comprises:
generating the error explanation based on a machine learning algorithm.

19. The method of claim 15, where receiving the error log comprises:
receiving the toll-free data service request that is associated with the error; and
where determining the cause of the error comprises:
determining the cause of the error based on the toll-free data service request.

20. The method of claim 15, where generating the error explanation comprises:
generating, based on the error log, the error explanation based on a machine learning algorithm; and
the method further comprising:
receiving, via a user interface associated with the user device, feedback information indicating whether the error explanation is helpful; and
configuring the machine learning algorithm to generate one or more other error explanations resembling the error explanation based on the feedback information indicating that the error explanation is helpful.

* * * * *